Patented Apr. 14, 1953

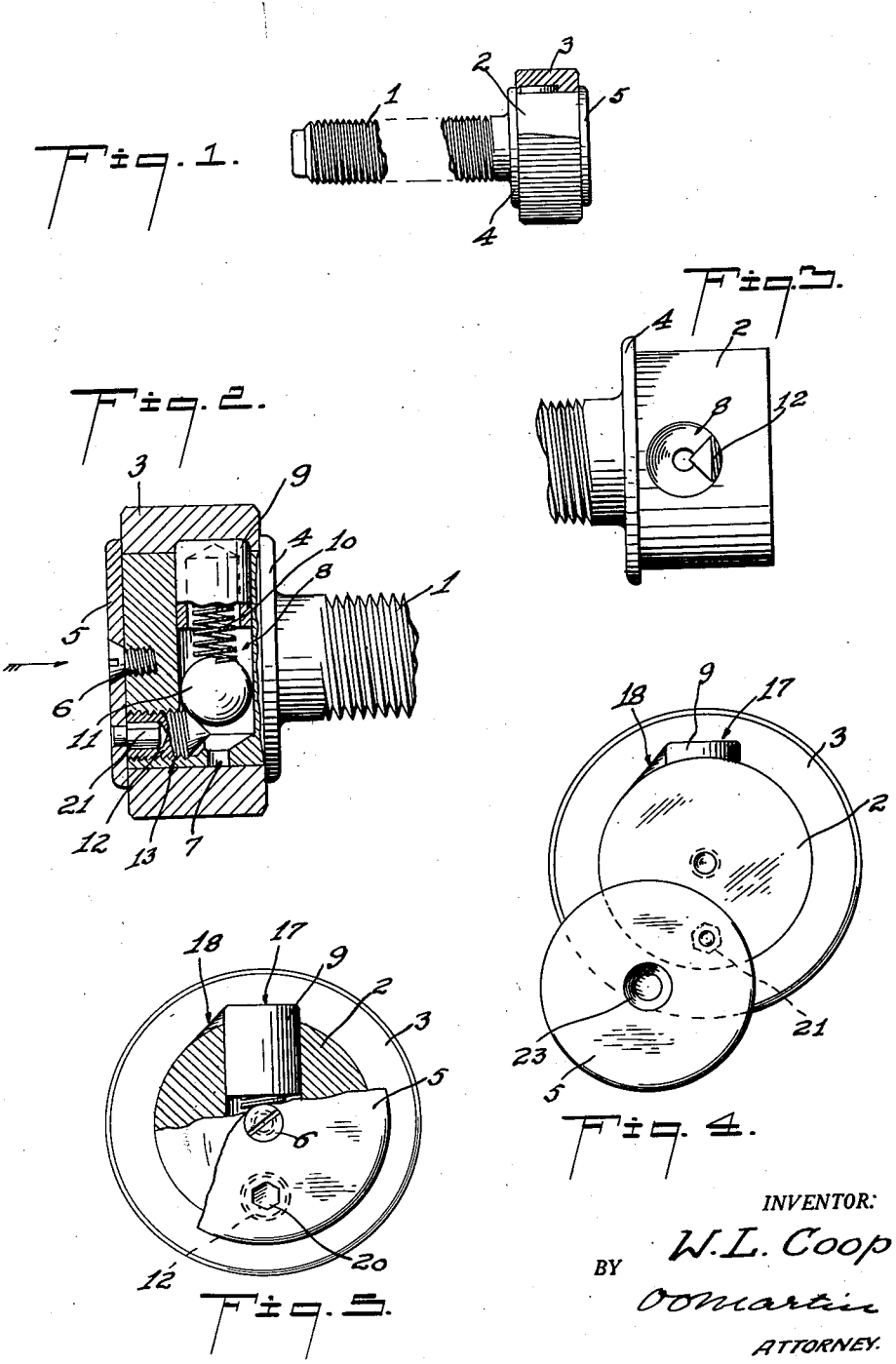

2,634,650

UNITED STATES PATENT OFFICE 2,634,650

THUMBSCREW WITH TORQUE RESPONSIVE OVERLOAD RELEASE

William L. Coop, Hawthorne, Calif.

Application November 7, 1949, Serial No. 126,028

4 Claims. (Cl. 85—9)

This invention relates to devices used in connection with drill jigs, milling fixtures and the like for maintaining parts to be machined properly supported to resist tool pressure during machining operations.

When parts to be machined are placed in such jigs or fixtures, it is necessary to apply to these parts sufficient pressure to resist the pressure of the cutting tool employed and so as to eliminate all danger of distorting the parts to be machined. When such pressure is manually applied, as by means of a common set screw, it is not possible for the operator by mere manual rotation of the screw to determine the correct amount of pressure required to make certain that the parts are properly supported, but it is generally found that too much pressure is applied. The parts are, for this reason, apt to become distorted even before the machining operation is commenced and so, when removed from the fixture, may fail to pass inspection.

It is, in view of these conditions, the general object of the invention to provide a pressure applying device in the form of a screw having on its head an element, rotation of which will advance the screw against the part to be machined thereby to exert a predetermined degree of pressure thereagainst. But the element is capable of slipping on the screw head if rotation thereof is continued, without further advancing the screw to apply additional pressure to the part. With this object in view, the invention consists of the combinations hereinafter fully described and a drawing is hereto annexed in which a preferred form of the invention is illustrated.

In the drawing:

Fig. 1 is a side elevational view of a device embodying the invention;

Fig. 2 shows on a larger scale the head of the device with portions thereof broken away in order to disclose the interior mechanism thereof;

Fig. 3 is added more clearly to show the shape of the head of the device.

Fig. 4 is an end view taken in the direction of the arrow of Fig. 2 and also with a portion thereof broken away for the sake of clearness; and Fig. 5 is an end view also taken in the direction of the arrow in Fig. 2 and showing parts of the device in a different position of adjustment.

As shown in the drawing, the device of the invention consists of a screw 1, which is fitted with a cylindrical head 2, on which an annular member or knob 3 is fitted to rotate. This knob is held in position between a shoulder 4 on the head and a disc 5 which, by means of a screw 6, is mounted in position on the end of the head for purposes which will be described presently. A hole 7 is bored transversely through the head on the center line thereof and this hole is counterbored to form a cylindrical chamber 8 extending from one side of the head nearly to the other side thereof and of a size slidably to receive therein a plunger 9. This plunger is thimble-shaped and the space within the plunger is proportioned freely to receive therein a compression spring 10, the outer end of which bears against a ball 11. This ball is seated freely to slide within the chamber 8 and it is maintained pressed against the spring 10 by means of a screw 12, the conical inner end of which comes to rest against the periphery of the ball when the screw is advanced into the threaded perforation 13 of the head.

In the inner periphery of the knob 3 is sunk a recess 17 of a size to receive therein the end of the plunger 9 and it is important to notice that one side of the cylindrical wall of this recess is, as indicated at 18, back on a slant, the bottom surface of which is tangential to the peripheral surface of the head 2. When the threads of the screw are made right-handed, as indicated in the drawing, and the knob is rotated clockwise on the head, it is found that the end of the plunger 9 will commence to ride along the bottom surface of the tangential incline 18 and so gradually to cause the plunger to become depressed against the tension of the spring 10. Continued clockwise rotation of the knob will cause the end of the plunger to ride along the inner peripheral surface of the knob until it again reaches the position of registration with the cylindrical recess 17, into which the plunger then again is projected by the spring.

It should be clear from the foregoing description that during such rotation of the knob the screw will become advanced against the part to be machined until a predetermined pressure is attained and that the moment this pressure is attained the knob will depress the plunger thereby to be liberated for further rotation on the head without effecting additional rotation of the screw. But it is also important to note that when the knob of the screw is rotated in the opposite direction the plunger becomes rigidly seated within the recess 17 positively to rotate the screw and so to insure extraction thereof. Had the recess been made slanting at the other side thereof also, as at 18, there would be no assurance that rotation of the knob would be effective to unscrew the screw since a little dirt settling in the screw threads might be sufficient to lock the screw so solidly in position that the knob would slip on the head of the screw. The pressure exerted by the plunger against the knob may be regulated by adjustment of the screw 12 in the manner which will now be described.

Into the outer end of the screw 12 is sunk a polygonal recess 20 of a size to receive therein a wrench of the ordinary well-known Allen type, by means of which the screw may be axially adjusted as required in order to apply the required amount of pressure to the plunger 9 through the spring 10. However, because such Allen wrench easily becomes mislaid or lost, and also in order to provide a completely self-contained and more conveniently operable device, I prefer to mount in the disc 5 a stud 21 which is shaped to fit the recess 20 of the screw. The stud is seated in this recess when the device is fully assembled, as illustrated in Fig. 2 and the clamping screw 6 inserted to lock the disc in position on the head 2. All danger of disturbing the position of adjustment of the pressure screw is eliminated when the device is in this manner assembled. Should it, however, at any time be desired to modify the adjustment of this pressure screw, it is merely required to withdraw the clamping screw 6 and to rotate the disc 5 in the desired direction, substantially as indicated in Fig. 4, to effect such readjustment of the pressure screw. When this readjustment is completed, it is merely required to withdraw the disc, together with the stud 21, from the head 2 and to turn the disc until this stud and the central passage 23 for the clamping screw 6 again are correctly aligned on the head, as indicated in Fig. 5, whereupon the stud is reseated and the clamping screw 6 applied to lock the disc in position on the head and the pressure screw 12 against displacement.

The embodiments of the invention in which an exclusive property or privilege is claimed are defined as follows:

1. A torque transmitting device comprising a screw having a cylindrical head, said head having a cylindrical passage transversely therethrough and a threaded socket axially sunk into the center of the outer surface thereof, an operating sleeve fitted to rotate on said head, a plunger seated in said passage, the sleeve having a recess in its inner wall for axial alinement with said passage to receive the end of said plunger, the wall of said recess being cut back on a slant to form a track tangential to the peripheral surface of the head, a resilient member in the passage urging the plunger into said recess, the sleeve being manually rotatable to rotate the screw to obtain the required torque, increased resistance by the screw causing the plunger to recede along said track, an adjusting screw seated in the end of the head with its axis parallel to the axis of the head for advancement into the passage to apply pressure to said resilient member, said screw having a polygonal indentation sunk into the outer end thereof, a disc coaxially seatable against the outer surface of the head to maintain the sleeve rotatably in position on the head, a screw axially seated in the center of the disc for engagement with the threaded socket of the head to lock the disc in position thereon and to cover the mechanism within the head and sleeve, and a polygonal stud inwardly projecting from the disc into the polygonal indentation of said pressure applying screw, the disc being rotatable on said stud upon withdrawal of the locking screw to rotate the pressure applying screw to adjust the tension of the resilient member and removable to withdraw the stud from the socket and to return it to coaxial position for reinsertion of the polygonal stud and for reseating of the locking screw.

2. A torque transmitting device comprising, a screw having a cylindrical head, said head having a cylindrical flange rising from the inner edge thereof, a cylindrical passage transversely therethrough and a threaded socket axially sunk into the center of the outer surface thereof, an operating sleeve fitted to rotate on said head, a plunger seated in said passage, the sleeve having a recess in its inner wall for axial alinement with said passage to receive the end of said plunger, the wall of said recess being cut back on a slant to form a track tangential to the peripheral surface of the head, a resilient member seated in the passage urging the plunger into said recess, the sleeve being manually rotatable to rotate the screw to obtain the required torque, increased resistance by the screw causing the plunger to recede along said track, a screw seated in the end of the head with its axis parallel to the axis of the head for advancement into the passage to apply pressure to said resilient member, said screw having a polygonal indentation sunk into the outer end thereof, a disc coaxially seatable against the outer surface of the head and the outer edge of the sleeve to maintain the sleeve rotatably in position against the flange of the head, a screw axially seated in the center of the disc for engagement with the threaded socket of the head to lock the disc in position thereon and to cover the mechanism within the head and sleeve, and a polygonal stud inwardly projecting from the disc into the polygonal indentation of said pressure applying screw, the disc being rotatable upon withdrawal of the locking screw to rotate the stud and the pressure applying screw to adjust the tension of the resilient member and removable to withdraw the stud from the socket and to return it to coaxial position for reinsertion of the polygonal stud and reseating of the locking screw.

3. A torque transmitting device comprising, a screw having a cylindrical head, said head having a cylindrical passage transversely therethrough and a threaded socket axially sunk into the center of the outer surface thereof, an operating sleeve fitted to rotate on said head, a plunger seated in said passage, the sleeve having a recess in its inner wall for axial alinement with said passage to receive the end of said plunger, the wall of said recess being cut back on a slant to form a track tangential to the peripheral surface of the head, a spring seated in the passage urging the plunger into said recess, a ball in the passage behind said spring, the operating sleeve being manually rotatable to rotate the screw to obtain the required torque, increased resistance by the screw causing the plunger to recede along said track, a screw seated in the end of the head with its axis parallel to the axis of the head for advancement into the passage to engage and move said ball thereby to adjust the tension of said spring, said screw having a polygonal indentation sunk into the outer end thereof, a disc coaxially seatable against the outer surface of the head to maintain the operating sleeve rotatably in position on the head, a screw axially seated in the center of the disc for engagement with the threaded socket of the head to lock the disc in position thereon and to cover the mechanism within the head and sleeve, and a polygonal stud inwardly projecting from the disc into the polygonal indentation of said pressure applying screw, the disc being rotatable upon withdrawal of the locking screw to rotate the stud and pressure applying screw to adjust the tension of the spring and removable to withdraw the stud from the socket and to return it to coaxial position for reinsertion of the polygonal stud and reseating of the locking screw.

4. A torque transmitting device comprising, a screw having a cylindrical head, said head having a cylindrical flange rising from the inner edge thereof, a cylindrical passage transversely therethrough and a threaded socket axially sunk into the center of the outer surface thereof, an operating sleeve fitted to rotate on said head, a plunger seated in said passage, the sleeve having a recess in its inner wall for axial alinement with said passage to receive the end of said plunger, the wall of said recess being cut back on a slant to form a track tangential to the peripheral surface of the head, a spring seated in the passage urging the plunger into said recess, a ball in the passage behind said spring, the operating sleeve being manually rotatable to rotate the screw to obtain the required torque, increased resistance by the screw causing the plunger to recede along said track, a screw seated in the end of the head with its axis parallel to the axis of the head for advancement into the passage to engage said ball thereby to apply pressure to said spring, said screw having a polygonal indentation sunk into the outer end thereof, a disc coaxially seatable against the outer surface of the head and the outer edge of the sleeve to maintain the sleeve rotatably in position against the flange of the head, a screw axially seated in the center of the disc for engagement with the threaded socket of the head to lock the disc in position thereon and to cover the mechanism with the head and sleeve, and a polygonal stud inwardly projecting from the disc into the polygonal indentation of said pressure applying screw, the disc being rotatable upon withdrawal of the locking screw to rotate the stud and the pressure applying screw to adjust the tension of the spring and removable to withdraw the stud from the socket and to return it to coaxial position for reinsertion of the polygonal stud and reseating of the locking screw.

WILLIAM L. COOP.

References Cited in the file of this patent

UNITED STATES PATENTS

| Number | Name | Date |
| --- | --- | --- |
| 888,694 | Chapman | May 26, 1908 |
| 1,041,194 | Terrian | Oct. 15, 1912 |
| 1,150,689 | Mahony | Aug. 17, 1915 |
| 2,136,190 | Gulfelt | Nov. 8, 1938 |
| 2,157,574 | Siesel | May 9, 1939 |
| 2,238,583 | Dodge | Apr. 15, 1941 |
| 2,373,812 | Coop | Apr. 17, 1945 |